United States Patent Office
2,891,835
Patented June 23, 1959

2,891,835
DIQUATERNARY AMMONIUM COMPOUNDS USED IN THE CATIONIC DYEING OF FIBERS OF POLYACRYLONITRILE

Erich Matter, Riehen, and Otto Albrecht, Neuewelt, Switzerland, assignors to Ciba Limited, Basel, Switzerland, a Swiss firm No Drawing. Application July 26, 1957
Serial No. 674,318

Claims priority, application Switzerland October 10, 1956

8 Claims. (Cl. 8—55)

This invention relates to a process for the dyeing of fibers of polyacrylonitrile.

It is known that for the dyeing of polyacrylonitrile fibers basic dyestuffs can be used, for example sulfonic acid group-free dyestuffs of the triarylmethane series, of the oxazine series or of the polymethine series. The dyeings thus obtained are in general distinguished by pure color shades and primarily by very good fastness properties. Difficulty was, however, hitherto encountered in obtaining good level dyeings, especially in combination dyeing, since the specified basic dyestuffs have in general the property of drawing very rapidly from the dye bath onto polyacrylonitrile fibers.

The present invention is based on the observation that dyeings of outstandingly level quality can be obtained with basic dyestuffs upon polyacrylonitrile fibers and such fibers as contain acrylonitrile as a substantial component of a co-polymer, when the dyeing is carried out in the presence of such quaternary ammonium salts as contain at least two quaternary nitrogen atoms and at least one, but preferably two higher-molecular aliphatic hydrocarbon radicals.

The diquaternary ammonium compounds used according to the invention as so-called "retarders" correspond especially to the general formula

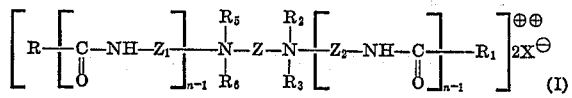

in which R and $R_1$ indicate a higher-molecular aliphatic hydrocarbon radical, $R_2$, $R_3$, $R_5$ and $R_6$ if desired substituted alkyl, cycloalkyl or aralkyl radicals, Z an alkylene radical which if desired is substituted or interrupted by hetero atoms, such as oxygen atoms or basic nitrogen atoms, or functional groups, Z and $Z_1$ are low molecular alkylene radicals, $n$ is a whole number of at most 2 and X is an anion.

Preferably such compounds of the Formula I are used in which the radicals R and $R_1$ are each a straight-chain alkyl radical with 12–18 carbon atoms, Z a low-molecular alkylene radical, if desired substituted by hydroxyl groups, $R_2$, $R_3$, $R_5$ and $R_6$ each an alkyl radical with one or two carbon atoms and X a halogen atom.

The polyacrylonitrile fibers to be dyed according to the present invention can be composed of polyacrylonitrile alone or also of mixtures containing a substantial proportion of polyacrylonitrile, for example co-polymers of acrylonitrile with acrylamide, acrylic esters and so on, or of mixtures of individual polymers having a substantial proportion of polyacrylonitrile.

The basic dyestuffs used for the dyeing are, for example, dyestuffs of the triarylmethane series, containing amine groups but free from sulfonic acid groups, which have in p-position to the central carbon atom one to three $NH_2$—, alkylamino, aralkylamino or arylamino groups. There are also concerned oxazine dyestuffs free from sulfonic acid groups, in the case of which two carbon atoms of the oxazine ring are at the same time members of a 6-membered aromatic ring, there being also present in the molecule at least one amino group in p-position with reference to the nitrogen atom of the oxazine ring. Finally there may be mentioned as examples of basic polymethine dyestuffs those of the formula

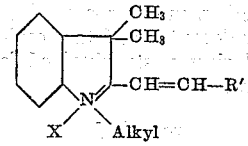

in which R' indicates an aromatic or heterocylic residue containing a basic group and X an anion.

The dyeing takes place by methods of known type, the dyestuffs being generally used directly as such, i.e. in the form of the dye salts, and advantageously in weakly acid, for example acid with acetic acid, aqueous baths, to which the quaternary ammonium compound acting as retarder is added, for example in a concentration of 0.15–2% calculated on the weight of the fiber, dyeing being carried out at elevated temperature. The dyeing process can be started between about 40 and 70° C. and completed at boiling temperature, or alternatively the dyeing can be carried out under pressure, i.e. in a closed vessel, at temperatures of 100–130° C. The presence of the quaternary ammonium compound exerts a restraining effect upon the basic dyestuff and thus causes the same to dye uniformly. With the concentrations of the retarder given above, with the customary dyestuff concentrations, the dye bath is practically exhausted at the end of the dyeing operation.

The resulting dyeings exhibit in addition to very good fastness properties a very good level quality.

The following examples illustrate the invention, the percentages being by weight.

*Example 1*

A polyacrylonitrile fiber fabric is entered into an aqueous dyebath containing 0.6% of the violet dyestuff mixture consisting of 1 part by weight of the blue dyestuff of the formula

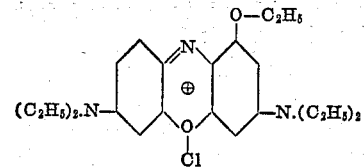

1 part by weight of the yellow dyestuff of the formula

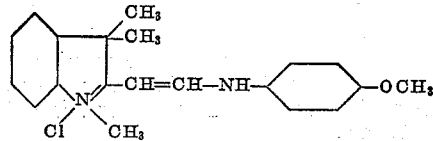

and 1 part by weight of the red dyestuff of the formula

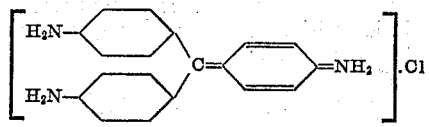

4% of acetic acid (40%) and 0.15% of the diquaternary ammonium compound of the formula

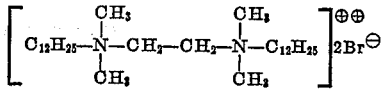

calculated on the weight of the fiber. The temperature is raised to boiling within ½ hour and dyeing conducted for 1 hour at boiling temperature. After this time the bath is practically exhausted. The dyeing is then rinsed and dried.

A good level violet dyeing is obtained.

The above specified quaternary ammonium compound can be prepared as follows:

11.6 grams of tetramethyl-ethylene diamine and 49.8 grams of lauryl bromide are stirred for 10 hours at 80–85° C. The whole is then stirred together with 400 cc. of anhydrous ether, put into a refrigerator to settle, the liquid carefully decanted and the residue dried under vacuum. The colorless paste obtained is soluble to a clear solution in water.

*Example 2*

A polyacrylonitrile fiber fabric is entered into an aqueous dye bath containing 0.6% of the violet dyestuff mixture used in Example 1, 4% of acetic acid (40%) and 0.15% of the diquaternary ammonium compound of the formula

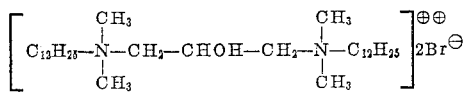

calculated on the weight of the fiber, and dyeing carried out as described in Example 1.

A good level violet dyeing is obtained.

The above specified dequaternary ammonium compound can be prepared as follows:

14.6 grams of N-tetramethyl-β-hydroxypropylene diamine are treated with 49.8 grams of dodecyl bromide and the whole heated on the water bath for 12 hours. The resulting product is a light colored paste which dissolves in water to a clear solution.

*Example 3*

A polyacrylonitrile fiber fabric is entered into an aqueous dye bath containing 0.6% of the violet dyestuff mixture used in Example 1, 4% of acetic acid and 0.15% of the diquaternary ammonium compound of the formula

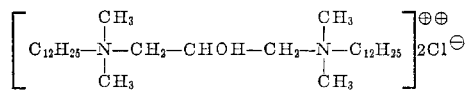

calculated on the weight of the fiber and dyeing carried out as described in Example 1.

A good level violet dyeing is obtained.

The above specified diquaternary ammonium compound can be obtained as follows:

2 mols of dimethyl laurylamine are treated with cooling with 1 mol of concentrated hydrochloric acid, the temperature not being allowed to rise above 40° C. The paste is introduced into a stirring flask, the air displaced by nitrogen and while stirring at 80–85° C. 1.02 mol of epichlorhydrin introduced. Stirring is carried out at 80–85° C. for about 6 hours. The reaction product is a yellowish paste still containing some water; it is soluble to a clear solution in water and is stable to sodium carbonate.

The same compound can also be obtained when first 1 mol of dimethyl laurylamine is quaternated with 1 mol of epichlorhydrin. The resulting quaternary ammonium salt of the formula

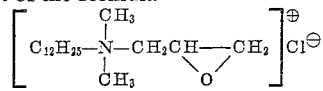

is then stirred with 1 mol of moist dimethyl laurylamine hydrochloride for 6 hours at 80–85° C.

*Example 4*

A polyacrylonitrile fiber fabric is entered into an aqueous dye bath containing 0.5% of the green dyestuff of the formula

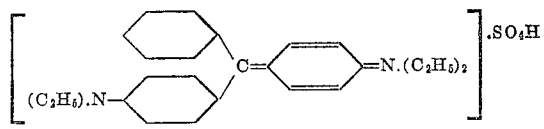

4% of acetic acid (40%) and 0.15% of the compound of the formula

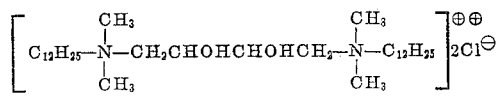

calculated on the weight of the fiber, and dyeing carried out as described in Example 1.

A good level green dyeing is obtained.

The above specified diquaternary ammonium compound can be prepared as follows:

244 grams of commercial dimethyl laurylamine are treated with cooling with a solution of 102 grams of concentrated hydrochloric acid in 256 cc. of water. A thick colorless paste is obtained. While stirring, in a stream of nitrogen at a temperature of 70–75° C., 44 grams of butadiene dioxide are added dropwise, stirring then being carried out for 4 hours at 70–80° C. The product is obtained in the form of 50% aqueous paste which on the addition of water gives clear solutions stable to sodium carbonate.

*Example 5*

A polyacrylonitrile fiber fabric is entered into an aqueous bath containing 0.6% of the violet dyestuff mixture used in Example 1, 4% of acetic acid (40%) and 0.15% of the diquaternary ammonium compound of the formula

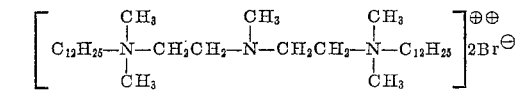

calculated on the weight of the fiber, and dyeing carried out as described in Example 1.

A good level violet dyeing is obtained.

The above specified diquaternary ammonium compound can be obtained as follows:

A mixture of 20 cc. of ethanol and 34.6 grams of pentamethyl-diethylene triamine is introduced into a stirring flask and the air displaced with nitrogen. At 80–85° C., with stirring, 100 grams of lauryl bromide are slowly introduced dropwise and then the whole is stirred for 8 hours at 90–95° C. After cooling, the reaction mixture is stirred with 200 cc. of anhydrous ether and then the light colored mass filtered with suction. The diquaternary ammonium salt is soluble to a clear solution with an alkaline reaction in water.

*Example 6*

A polyacrylonitrile fiber fabric is entered into an aqueous dye bath containing 0.6% of the violet dyestuff mixture described in Example 1, 4% of acetic acid (40%) and 0.5% of the diquaternary ammonium compound of the formula

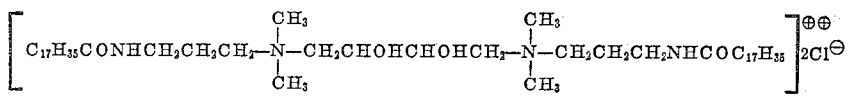

calculated on the weight of the fiber, and dyeing carried out for 75 minutes as described in Example 1.

A good level violet dyeing is obtained.

The above specified diquaternary ammonium compound can be prepared as follows:

101 grams of concentrated hydrochloric acid are added to a mixture of 100 cc. of butanol and 352 grams of dimethylamino-propyl-stearoyl amide at 45° C. with stirring. The temperature is then raised to 70° C. and 44 grams of butadiene dioxide are then added slowly. After the mixture has been stirred for 6 hours at 70 to 75° C., the solvent is distilled off and the residue dried.

A hard, pulverisable, yellowish mass is obtained which dissolves in water to a clear solution.

Example 7

A polyacrylonitrile fiber fabric is entered into an aqueous dye bath containing 0.6% of the violet dyestuff mixture used in Example 1, 4% of acetic acid (40%) and 0.5% of the diquaternary ammonium compound of the formula $$\left[ C_{12}H_{25}-\underset{\underset{CH_3}{|}}{\overset{\overset{CH_3}{|}}{N}}-CH_2-CHOH-CH_2-O-CH_2CH_2-O-\left[CH_2CHOH-CH_2-O-CH_2CH_2-O\right]_2-CH_2CHOHCH_2-\underset{\underset{CH_3}{|}}{\overset{\overset{CH_3}{|}}{N}}-C_{12}H_{25} \right]^{\oplus\oplus} 2Cl^{\ominus}$$

calculated on the weight of the fiber, and dyeing carried out as described in Example 1.

A good level violet dyeing is obtained.

The above specified diquaternary ammonium compound can be prepared as follows:

122 grams of dimethyl-lauryl amine are mixed with a solution of 50 grams of concentrated hydrochloric acid in 217 cc. of water at 30 to 40° C. in a current of nitrogen. 113 grams of the di-epoxy compound of the formula $$CH_2\underset{O}{\overset{\diagdown\diagup}{-}}CH-CH_2-O-CH_2CH_2-O-\left[CH_2CHOHCH_2-O-CH_2-CH_2-O\right]_2-CH_2-CH\underset{O}{\overset{\diagdown\diagup}{-}}CH_2$$

are added dropwise at 40° C. and the whole is stirred for 4 hours at 75 to 80° C., and then for 2 hours at 85 to 90° C.

By adding isopropanol a clear solution of 30% strength is obtained.

Example 8

A polyacrylonitrile fiber fabric is entered in an aqueous dyeing bath containing 0.6% of the violet dyestuff mixture used in Example 1, 4% acetic acid (40%) and 0.5% of the diquaternary ammonium compound of the formula $$\left[ C_{12}H_{25}-\underset{\underset{CH_3}{|}}{\overset{\overset{CH_3}{|}}{N}}-CH_2CHOHCH_2O(CH_2)_4O-CH_2CHOHCH_2-\underset{\underset{CH_3}{|}}{\overset{\overset{CH_3}{|}}{N}}-C_{12}H_{25} \right]^{\oplus\oplus} 2Cl^{\ominus}$$

calculated on the weight of the fiber, and dyeing is carried out as described in Example 1.

A good, level, violet dyeing is obtained.

The above diquaternary ammonium compound can be prepared as follows:

48.8 grams of commercial dimethyl-laurylamine are dissolved in 60 grams of isopropanol and put into a flask fitted with stirring means. The air is expelled with nitrogen, and a solution of 20.2 grams of concentrated hydrochloric acid in 5 cc. of water is added while stirring and cooling. At 70 to 75° C. a mixture of 26.8 grams of 1:4-butane-diol-diglycidyl ether and 5 grams of isopropanol is added, and the whole is stirred for another 4 hours at 70 to 75° C.

166 grams of a yellow, clear solution of 50% strength of the diquaternary salt are obtained.

Example 9

A polyacrylonitrile fiber fabric is entered in an aqueous dyeing bath containing 0.6% of the violet dyestuff mixture used in Example 1, 4% of acetic acid (40%) and 0.5% of the diquaternary ammonium compound of the formula $$\left[ RCONHCH_2CH_2CH_2-\underset{\underset{CH_3}{|}}{\overset{\overset{CH_3}{|}}{N}}-CH_2CHOHCH_2O(CH_2)_4OCH_2CHOHCH_2-\underset{\underset{CH_3}{|}}{\overset{\overset{CH_3}{|}}{N}}-CH_2CH_2CH_2NHCOR \right]^{\oplus\oplus} 2Cl^{\ominus}$$

R=coconut oil fatty acid radical calculated on the weight of the fiber, and dyeing is carried on as described in Example 1.

A good, level, violet dyeing is obtained.

The above diquaternary ammonium compound can be prepared as follows:

60.8 grams of dimethylamino propyl coconut oil fatty acid amide are dissolved in 70 grams of isopropanol in a flask fitted with stirring means. After the air has been expelled with nitrogen, a solution of 20.2 grams of concentrated hydrochloric acid in 5 cc. of water is added while stirring and cooling. The mixture is heated to about 70° C. A solution of 26.8 grams of 1:4-butane-diol-diglycidyl ether in 7 grams of isopropanol is added and the whole is stirred for 4 hours at 70 to 75° C.

The 50% solution of the diquaternary ammonium salt is yellow and clear and remains unchanged after being diluted with water and the addition of caustic soda solution.

Example 10

A polyacrylonitrile fiber fabric is entered in an aqueous dyeing bath containing 0.6% of the violet dyestuff mixture used in Example 1, 4% of acetic acid (40%) and 0.5% of the diquaternary ammonium compound of the formula $$\left[ C_{18}H_{35}-\underset{\underset{CH_3}{|}}{\overset{\overset{CH_3}{|}}{N}}-CH_2CHOHCH_2O(CH_2)_4OCH_2CHOHCH_2-\underset{\underset{CH_3}{|}}{\overset{\overset{CH_3}{|}}{N}}-C_{18}H_{37} \right]^{\oplus\oplus} 2Cl^{\ominus}$$

calculated on the weight of the fiber, and dyeing is carried on as described in Example 1.

A good, level, violet dyeing is obtained.

The above diquaternary ammonium compound can be prepared as follows:

64.2 grams of commercial dimethyl-stearylamine are dissolved in a flask fitted with stirring means. The air is expelled with nitrogen and 20.2 grams of concentrated hydrochloric acid in 5.4 cc. of water are slowly added. 26.8 grams of 1:4-butane-diol-diglycidyl ether in 10 cc. of isopropanol are added to the warm solution. The reaction mixture is stirred for 4 hours at 70 to 75° C., and 196.6 grams of a clear, yellow solution of 50% strength of the diquaternary salt are obtained.

*Example 11*

A polyacrylonitrile fiber fabric is entered in an aqueous dyeing bath containing 0.6% of the violet dyestuff mixture used in Example 1, 4% of acetic acid (40%) and 0.5% of the diquaternary ammonium compound of the formula

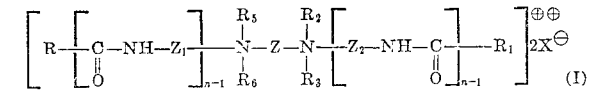

calculated on the weight of the fiber, and dyeing is carried on as described in Example 1.

A good, level, violet dyeing is obtained.

The above diquaternary ammonium compound can be obtained as follows:

To a solution of 70.4 grams of dimethylamino-propyl-stearoylamide in 80 grams of isopropanol there are added 20.2 grams of concentrated hydrochloric acid in 11.6 cc. of water in a nitrogen atmosphere. 26.8 grams of 1:4-butane-diol-diglycidyl ether are added at 70 to 75° C., and the whole is stirred for 4 hours until the reaction is complete. 209 grams of a clear, yellow, 50% solution of the diquaternary ammonium salt are obtained.

What is claimed is:

1. A process for the level dyeing of fibers of an acrylonitrile polymer in an aqueous bath containing at least one basic dyestuff, which comprises conducting the dyeing in the presence of such a quaternary ammonium salt as contains at least two quaternary nitrogen atoms and at least one higher molecular aliphatic hydrocarbon radical.

2. A process for the level dyeing of fibers of an acrylonitrile polymer in an aqueous bath containing at least one basic dyestuff, which comprises conducting the dyeing in the presence of a diquaternary ammonium salt of the general formula

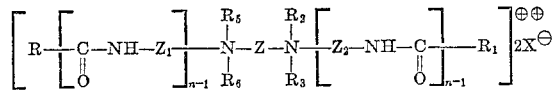 (I)

in which R and $R_1$ indicate a higher-molecular aliphatic hydrocarbon radical, $R_2$, $R_3$, $R_5$ and $R_6$ are radicals selected from the group consisting of aliphatic radicals, cycloaliphatic radicals and araliphatic radicals, Z is a bivalent aliphatic radical, $Z_1$ and $Z_2$ represent low-molecular alkylene radicals, $n$ is an integer of at most 2 and X is an anion.

3. A process for the level dyeing of fibers of an acrylonitrile polymer in an aqueous bath containing at least one basic dyestuff, which comprises conducting the dyeing in the presence of a diquaternary ammonium salt of the general formula

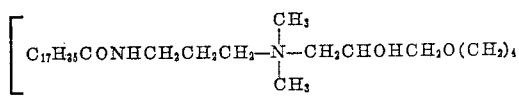

in which the radicals R and $R_1$ are each a straight-chain alkyl radical with 12–18 carbon atoms, Z is a low-molecular bivalent aliphatic radical, $R_2$, $R_3$, $R_5$ and $R_6$ each represent an alkyl radical with at most two carbon atoms, $Z_1$ and $Z_2$ represent low molecular alkylene radicals, $n$ is an integer of at most 2 and X is a halogen atom.

4. A process for the level dyeing of fibers of an acrylonitrile polymer in an aqueous bath containing at least one basic dyestuff, which comprises conducting the dyeing in the presence of the diquaternation product from 1 mol of tetramethyl-ethylene diamine and 2 mols of dodecyl bromide.

5. A process for the level dyeing of fibers of an acrylonitrile polymer in an aqueous bath containing at least one basic dyestuff, which comprises conducting the dyeing in the presence of the diquaternation product from 1 mol of tetramethyl-$\beta$-hydroxypropylene diamine and 2 mols of dodecyl bromide.

6. A process for the level dyeing of fibers of an acrylonitrile polymer in an aqueous bath containing at least one basic dyestuff, which comprises conducting the dyeing in the presence of the diquaternary ammonium compound from 2 mols of dimethyl laurylamine, 1 mol of HCl and 1 mol of epichlorhydrin.

7. A process for the level dyeing of fibers of an acrylonitrile polymer in an aqueous bath containing at least one basic dyestuff, which comprises conducting the dyeing in the presence of the diquaternary ammonium compound from 2 mols of dimethyl laurylamine, 2 mols of HCl and 1 mol of butadiene dioxide.

8. A process for the level dyeing of fibers of an acrylonitrile polymer in an aqueous bath containing at least one basic dyestuff, which comprises conducting the dyeing in the presence of the quaternary ammonium compound from 1 mol of N:N:N':N':N''-pentamethyl-diethylene triamine and 2 mols of dodecyl bromide.

References Cited in the file of this patent

Du Pont, Dyes and Chemicals Tech. Bull., vol. 13, No. 1, March 1957, pp. 9–14.

Du Pont, Technical Infor. Bull., OR–51, June 1955, p. 6.

Du Pont, Technical Bull., vol. 11, No. 1, March 1955, pp. 4–5.

Haynes: Chem. Trade Names and Commercial Synonyms, 2nd ed., October 1955, D. Van Nostrand Co., N.Y., p. 360.

UNITED STATES PATENT OFFICE

CERTIFICATE OF CORRECTION

Patent No. 2,891,835                  June 23, 1959

Erich Matter et al

It is hereby certified that error appears in the printed specification of the above numbered patent requiring correction and that the said Letters Patent should read as corrected below.

Column 1, line 50, for "Z and $Z_1$" read -- $Z_1$ and $Z_2$ --; column 3, line 31, for "dequaternary" read -- diquaternary --.

Signed and sealed this 1st day of December 1959.

(SEAL)

Attest:
KARL H. AXLINE

Attesting Officer

ROBERT C. WATSON
Commissioner of Patents